INVENTORS
W. KLEIN
W. FRIZ

ATTORNEY 2,871,393

TRAVELING WAVE TUBE OF HIGH AMPLIFICATION

Werner Klein, Korntal, Wurttemberg, and Walter Friz, Stuttgart, Germany, assignors to International Standard Electric Corporation, New York, N. Y., a corporation of Delaware Application August 24, 1955, Serial No. 530,295

Claims priority, application Germany September 16, 1954

5 Claims. (Cl. 315—3.5)

In traveling wave tubes the high-frequency circuit, in which amplification is effective, usually consists of a helix. Due to the fact that the tubes have an amplifying effect over very large frequency ranges, there may easily exist frequencies at which there appears a complete reflection of the signal either at the input or at the output. A wave reflected at the output will then cause a self excitation at the input if it is insufficiently damped. For this reason the damping of the delay line should have at least the same magnitude as the amplification of the tube. In common practice the damping will be chosen a predetermined magnitude higher than the amplification, in order to obtain in this way a certain safety factor (oscillating space). Tubes have become known in which the damping of the delay line is effective in certain parts of the tube, as an equally distributed damping or e. g. as a localized damping.

An understanding of the invention may best be had from the following description made with reference to the accompanying drawing, wherein.

Figure 1A:
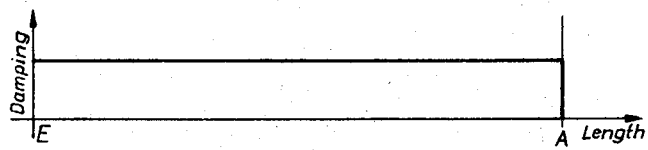
Figs. 1a to 1d are curves illustrating the damping plotted against helix length in various known forms of tubes.
Figure 1B:
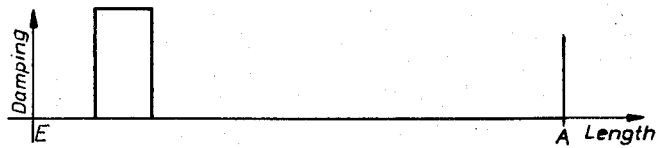
Figure 1C:
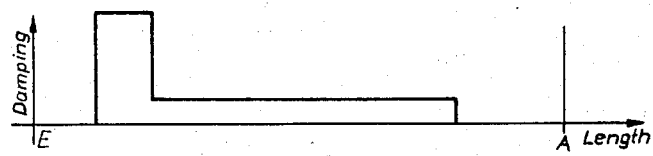
Figure 1D:
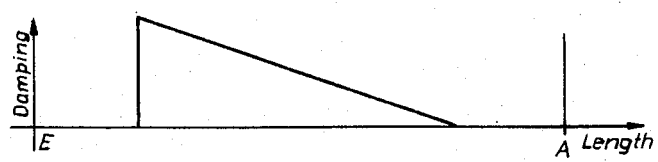

Fig. 1 of the accompanying drawings shows various of the hitherto conventional damping distributions along the helix. In Fig. 1a there is shown a damping which is distributed over the whole helix of the length from the input E to the output A. A damping of the helix so distributed reduces the amplification and the achievable maximum HF-output. Furthermore, this type requires that the damping value must be closely adhered to in order to obtain the same amplification in the case of different tubes. In Fig. 1b there is shown a localized damping of a very high value applied to the input-sided part of the helix. In this arrangement the damping does not produce an appreciable loss in amplification and output, if chosen sufficiently high. In such a case there is no amplification between wave and beam within the damping zone. However, the useful length of the helix will thereby be reduced by the amount of length of the localized damping part. Anyhow, owing to the great electronic amplification bandwidth of the tube there appear between the damped and the undamped zone of the helix unavoidable reflections which are likely to cause a self excitation in the output side of the helix. Accordingly, a good impedance matching between the localized damping and the output side of the helix section is required in the case of a high amplification (>10 db). Beyond the localised damping section a stable amplification of more than 25 db is very difficult to obtain, because here the reflection factor at the localized damping section must be smaller than 10%. This corresponds to an echo current damping or attenuation of >20 db. In order to overcome this difficulty, Fig. 1c shows an arrangement in which beyond the actual localized damping there follows first of all a section of a moderate damping and only a short helix section on the output side is left with little or no damping. This arrangement has advantages with regard to the stability of the operation, because the transition from a very high damping to a moderate one can be more easily realized in a low reflection manner, than a transition from a very high damping to a helix section without damping. A disadvantage of this arrangement may be seen in the realization of the weak damping, because this damping affects the amplification and the value of the damping, therefore, is a critical one. Fig. 1d shows an arrangement resembling the one of Fig. 1c, but with the aid of which there can be obtained a better matching between the output of the tube and the damped helix. The good matching, of course, is effected in this case only at the output side end of the helix, because at that point the oscillating tendency is the greater. In Figs. 1b, 1c, 1d the point of the highest damping is displaced so far towards the input of the tube that it starts at that point where the amplified wave, which had been reduced at the beginning by the distribution damping, reaches the level of the coupled network wave. Hence on the input side practically no amplification is effective. With the aid of these damping arrangements amplifications of up to about 35 db have become known. In tubes of a very high amplification, above 50 db, these damping arrangements, however, have proved to be insufficient. The moderate damping in the output circuit which is necessary for avoiding the self excitation (Figs. 1a, 1b, 1c) causes a limitation of the amplification towards the high values and, in addition, makes them dependent upon the level to a very considerable extent.

According to the invention, therefore, it is suggested, for the purposes of obtaining a high amplification, to arrange the zone of the very high damping in such a way that the maximum of the very high damping is arranged after at least 50% of the total amplification as seen from the input of the tube has been accomplished. Beyond this damping maximum there is still supplied at least 8 db of amplification up to the energy output point. If the tube has a total amplification of about 50 to 60 db then it is considered to be advantageous to provide the maximum damping after 60 to 70% of the total amplification; in the case of a total amplification of only 35 to 50 db the damping maximum will be provided after about 50 to 60% of the total amplification. The zone of very high damping is designed to extend over about 10 to 20% of the total length of the tube. The transitions from weakly dampened or undampened helices to the zone of very high damping are preferably chosen approximately exponential.

Figure 2A:
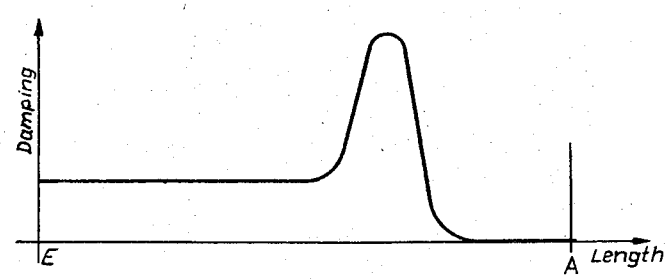
Figs. 2a and 2b are similar curves using the distribution of damping according to the present invention.

The zone of very high damping is arranged as far towards the output of the helix as is possible without suffering any appreciable losses of maximum HF-output power. The transition to the high damping is effected by providing a small longitudinal extension, in an approximately exponential manner to obtain as little reflection as possible. For improving the stability and for weakening unavoidable reflections in the zone of a high amplification in the input side of the section of the helix, this section of the helix is provided with a moderate damping. This results in a distribution of damping as is shown in Fig. 2a of the drawings. The first part of the input side helical section may be designed to have little damping so that the formation of the amplified wave on the helix is effected after a short as possible helical section. The moderate damping of the remaining section of the helix can be realized by means of a well-resistant helix material (such as nickel manganese, chrome nickel or copper nickel), whereas the first part of this section can be kept at a low damping by subjecting the helix material to a treatment, e. g. by gilding. The section of the helix following the zone of high damping, for the purpose of obtaining a high HF-output power, is provided with a damping as low as possible (almost free from damping). This may be achieved by the employment of good conductors, e. g. by tungsten, molybdenum, or copper wire serving as helix material, or else by way of a surface treatment (e. g. copper-plating, silver-plating, or gilding).

Figure 2B:
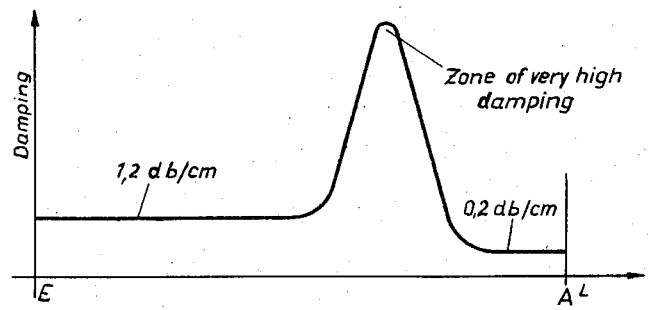
Figure 3:
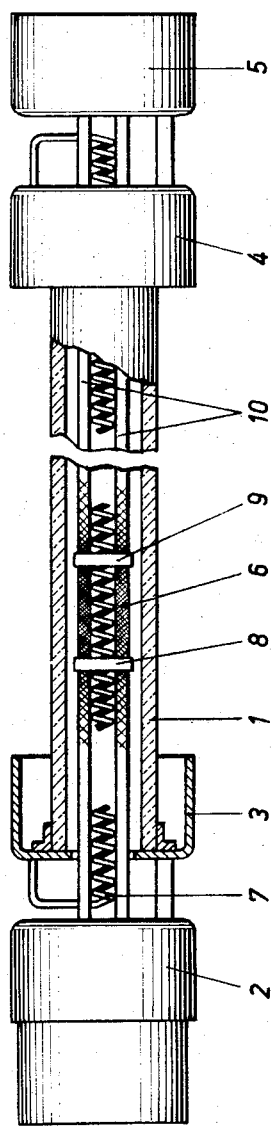
Fig. 3 is a tube, partly in section, incorporating the invention.

The invention will now be particularly described with reference to an exemplified embodiment (Fig. 2b). Supposing there exists a tube which has an amplification of 55 db. The damping in the backward direction amounts to 75 db, because there is provided an oscillating space of 20 db. The high-frequency circuit of the tube is shown in Fig. 3. Reference numeral 1 indicates a dielectric tube (pipe) for the connection of the pairs of the input and output circuit coupling elements 2, 3 and 4, 5. The localized damping of a very high value 6, which is necessary for the decoupling of the input and output circuit, is applied in this case to the helix holding bars 10. The helix 7 is mounted with its two ends to the sealing cylinders 2 and 5. Within the localized damping section 6 there are arranged the two holding clips 8 and 9 which serve to additionally fix the helices and, at the same time, press the holding bars 10 which are provided with a damping coating, against the helices thereby realizing a localized damping which is insensitive to shocks. The operating voltage amounts to 1300 volts, the beam current to 32 ma. In the input side part of the helix there is chosen a damping of 1, 2 db/cm. The output side part of the helix has a damping of 0.2 db/cm. The localized damping with the approximately exponential damping transition is applied to the helix holding bars and extends over two helix sections on both sides of the holding bars about 2 centimeters.

With the aid of this arrangement it is possible to realize a tube having the above-mentioned high amplification of 55 db. At a rated current of 32 ma. this arrangement operates in a stable manner. Only at a beam current of more than 45 ma. there will appear a self excitation; the maximum HF-output power amounts at the rated current to 5 watts. A further advantage of this arrangement is that there are only two additional reflection points unlike to the arrangement according to Fig. 1c, which has three reflection points. The section of a moderate damping can be obtained merely by choosing the proper helix wire, which results in far better uniform results than when employing a moderate additional damping in the field of the helix.

The additional damping of a very high value may be applied to the field of the helix, because this damping value does not substantially affect the amplification and, therefore, is not critical. The connection of the helix parts is effected in the zone of high damping and is, therefore, non-critical. With the aid of this damping arrangement it is possible to make tubes having a substantially higher amplification than was possible up to now.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. A traveling wave tube having a delay line along which energy to be amplified is propagated, an input coupler at one end of said delay line, an output coupler at the other end of said delay line, a support extending along said helix and in contact therewith, damping material coated on said support in variably distributed form to provide attenuation of energy increasing substantially to a maximum and then decreasing, said damping material extending between 10% and 20% of the length of said helix, the region of said damping material at which said attenuation is maximum being positioned more than half way along said helix but less than 70% of the length of said helix from said input coupler.

2. A traveling wave tube having a delay line along which energy to be amplified is propagated, an input coupler at one end of said delay line, an output coupler at the other end of said delay line, a support extending along said helix and in contact therewith, damping material coated on said support in variably distributed form to provide attenuation of energy increasing substantially exponentially to a maximum and then decreasing exponentially, said damping material extending between 10% and 20% of the length of said helix, the region of said damping material at which said attenuation is maximum being positioned more than half way along said helix but less than 60% of the length of said line from said input coupler.

3. A traveling wave tube having a delay line along which energy to be amplified is propagated, an input coupler at one end of said delay line, an output coupler at the other end of said delay line, a support extending along said helix and in contact therewith, damping material coated on said support in variably distributed form to provide attenuation of energy increasing substantially exponentially to a maximum and then decreasing exponentially, said damping material extending between 10% and 20% of the length of said helix, the region of said damping material at which said attenuation is maximum being positioned between 60% and 70% of the length of said helix from said input coupler.

4. A traveling wave tube having a helix along which energy to be amplified is propagated, an input coupler at one end of said helix, an output coupler at the other end of said helix, a plurality of support rods extending along said helix and in contact therewith, damping material coated on said support rods in variably distributed form to provide attenuation of energy increasing substantially exponentially to a maximum and then decreasing exponentially, said damping material extending between 10% and 20% of the length of said helix, the region of said damping material at which said attenuation is maximum being positioned more than halfway along said helix but less than 70% of the length of said helix from said input coupler.

5. A traveling wave tube having a helix along which energy to be amplified is propagated, an input coupler at one end of said helix, an output coupler at the other end of said helix, a plurality of support rods extending along said helix and in contact therewith, damping material coated on said support rods in variably distributed form to provide attenuation of energy increasing substantially exponentially to a maximum and then decreasing exponentially, said damping material extending between 10% and 20% of the length of said helix, the region of said damping material at which said attenuation is maximum being positioned more than half way along said helix but less than 70% of the length of said helix from said input coupler, and a pair of clamp members about said rods on opposite sides of said maximum attenuation region for assuring close contact of said helix and said coating over this region.

References Cited in the file of this patent

UNITED STATES PATENTS

| | | |
|---|---|---|
| 2,575,383 | Field | Nov. 20, 1951 |
| 2,602,148 | Pierce | July 1, 1952 |
| 2,626,371 | Barnett et al. | Jan. 20, 1953 |
| 2,636,948 | Pierce | Apr. 28, 1953 |
| 2,669,674 | Diemer | Feb. 16, 1954 |
| 2,707,759 | Pierce | May 3, 1955 |
| 2,730,649 | Dewey | Jan. 10, 1956 |
| 2,771,565 | Bryant | Nov. 20, 1956 |